United States Patent [19]

Saito et al.

[11] Patent Number: 5,297,014
[45] Date of Patent: Mar. 22, 1994

[54] SWITCHING DC POWER SUPPLY APPARATUS

[75] Inventors: Masayoshi Saito, Chiba; Takashi Birumachi, Yokohama, both of Japan

[73] Assignee: Canon Kabushiki Kaisha, Tokyo, Japan

[21] Appl. No.: 816,725

[22] Filed: Jan. 3, 1992

[30] Foreign Application Priority Data

Jan. 9, 1991 [JP] Japan .................. 3-001115
Jul. 16, 1991 [JP] Japan .................. 3-175237
Oct. 25, 1991 [JP] Japan .................. 3-279592

[51] Int. Cl.$^5$ .................. H02M 3/335; H02H 7/122
[52] U.S. Cl. .................. 363/21; 363/57; 363/97; 361/93; 361/111
[58] Field of Search .......... 363/16, 19, 20, 21, 363/23, 25, 56, 57, 97, 98; 323/275, 285, 349, 381; 361/93, 111

[56] References Cited

U.S. PATENT DOCUMENTS

| 4,146,832 | 3/1979 | McConnell . |
| 4,736,254 | 4/1988 | Seeger .................. 361/18 |
| 5,060,131 | 10/1991 | Sikora .................. 363/97 |
| 5,132,606 | 7/1992 | Herbert . |
| 5,177,676 | 1/1993 | Inam et al. .................. 363/97 X |
| 5,180,954 | 1/1993 | Ewing . |

Primary Examiner—Emanuel T. Voeltz
Attorney, Agent, or Firm—Fitzpatrick, Cella, Harper & Scinto

[57] ABSTRACT

A DC power supply apparatus includes a switching transformer having a switching element, a primary current detection circuit, arranged on a primary side of the transformer, for detecting a current flowing in the switching element, a secondary current detection circuit for detecting an output current from a secondary side of the transformer, and a control circuit for controlling the switching element on the basis of outputs from the primary and secondary current detection circuit.

13 Claims, 14 Drawing Sheets

SWITCHING DC POWER SUPPLY APPARATUS

BACKGROUND OF THE INVENTION

1. Field of the Invention

The present invention relates to a switching DC power supply apparatus having an overcurrent protective circuit for realizing optimal overcurrent protection, wherein the ability to supply peak currents is required more than the ability to supply average currents as in the case of current supply to a motor load or the like.

2. Related Background Art

As DC power supply apparatuses for various types of electronic devices, switching DC power supply apparatuses have been widely used because they are compact, lightweight, and highly efficient.

FIG. 5 shows the arrangement of a conventional switching DC power supply apparatus having an output stabilizing circuit.

Referring to FIG. 5, the apparatus includes input power supply terminals 1 and 2. The input power supply terminal 1 is connected to an input capacitor C1 and a primary winding N1 of a transformer T1.

One end of the primary winding N1 is connected to the collector of a switching transistor Q1. A secondary winding N2 of the transformer T1 is connected to a smoothing capacitor C2 through a rectifying diode Q3. A smoothed output obtained by this filter circuit is supplied to a predetermined load through output terminals 4 and 5.

In order to detect an output voltage applied to the load, a voltage detection circuit 6 is connected in parallel with the load (not shown) connected to the terminals 4 and 5. A detected voltage value is fed back to a control circuit constituted by a PWM circuit 3 through a photocoupler Q4.

The photocoupler Q4 output the fed-back detected voltage to the PWM circuit 3. The PWM circuit 3 controls the switching duty ratio or frequency of a driving pulse supplied to the base of the switching transistor Q1 in accordance with the detected voltage value.

The switching transistor Q1 is driven by an output from the PWM circuit 3.

For a protective function, a current flowing in the switching transistor Q1 is detected by a primary current detection means A constituted by a comparator Q2, a detection resistor R1, and the like.

An overcurrent protective operation in the circuit shown in FIG. 5 will be described next.

When a power supply is connected to the input power supply terminals 1 and 2, voltage application to the primary winding N1 of the transformer T1 is ON-/OFF-controlled by the switching transistor Q1.

The AC output generated by the ON/OFF operation of the switching transistor Q1 is insulated and transformed by the transformer T1.

The insulated AC output is rectified by the diode Q3. The rectified output is smoothed by the smoothing capacitor C2 and is subsequently supplied to the load through the output terminals 4 and 5.

If a larger load is set and a larger current is output from the switching transistor Q1, a higher voltage is generated across the detection resistor R1. When this voltage exceeds the threshold value of the comparator Q2, a signal is output to the PWM circuit 3. In response to the signal from the comparator Q2, the PWM circuit 3 stops a pulse output operation. This operation is performed for every pulse.

Resistors R2 and R3, and a capacitor C3 constituting the primary current detection means A serve as a filter circuit for preventing an operation error due to spike noise, whereas resistors R4 and R5 serve to set a threshold value.

According to such a conventional apparatus, however, in a power supply for supplying more peak load currents than average currents as in the case of current supply to a motor load, since the detection current value of the primary current detection means A is set in accordance with the value of the peak load current, if an overload state continues because of a load error or the like, the power supply is continuously operated with the maximum current, resulting in overheating. Furthermore, in order to prevent such overheating, the heat capacity of a heat sink plate must be increased or an overheat protective circuit must be added. This poses other problems, e.g., an increase in size and cost of the power supply.

The apparatus shown in FIG. 5 has only one output system. FIG. 6 is a circuit diagram showing a conventional switching DC power supply apparatus having two output systems.

Referring to FIG. 6, the apparatus includes input power supply terminals 1' and 2', which are connected to an input capacitor C1' and are further connected to a primary winding N1' of a transformer T1' through a resistor R1' and a switching transistor Q1'.

A secondary winding N2' of the transformer T1' is connected to a smoothing capacitor C2' through a rectifying diode Q3'. The smoothed output obtained this filter circuit is supplied to a first load through output terminals 4' and 5'.

Similarly, a secondary winding N3' is connected to a smoothing capacitor C3' through a rectifying diode Q4'. The smoothed output obtained by this filter circuit is supplied to a second load through output terminals 6' and 7'.

In order to detect an output voltage applied to the first load, an output voltage detection circuit 8' is connected in parallel with the first load (not shown) connected to the output terminals 4' and 5'. The detected value is fed back to a control circuit constituted by a PWM (pulse width modulation) circuit 3' through a photocoupler Q5'.

The PWM circuit 3' controls the switching duty ratio or frequency of a driving pulse supplied to the base of the switching transistor Q1' in accordance with the detected value. In this manner, the switching transistor Q1' is driven by an output from the PWM circuit 3', and the voltage across the output terminals 4' and 5' is controlled to be a predetermined value.

For a protective function, a voltage proportional to the instantaneous value of a switching current flowing in the switching transistor Q1 is obtained as a detected voltage by the resistor R1'. Resistors R2' and R3' constitute a resistance voltage dividing circuit for dividing the detected voltage obtained by the resistor R1' into proper values.

Resistors R4' and R5' constitute a resistance voltage dividing circuit for setting a threshold voltage for overload detection. A comparator Q2' of a comparison circuit serves to compare a detected voltage with a threshold voltage.

An overload protective operation in the circuit shown in FIG. 6 will be described below.

When a DC power supply is connected to the input power supply terminals 1' and 2', voltage application to the primary winding N1' of the transformer T1' is ON-/OFF-controlled by the switching transistor Q1'. The AC output generated by the ON/OFF operation of the switching transistor Q1' is insulated and transformed by the transformer T1'.

The insulated and transformed AC output is rectified by the diode Q3'. The rectified output is smoothed by the smoothing capacitor C2' and is subsequently supplied to the first load through the output terminals 4' and 5'.

Similarly, the rectified output obtained by the diode Q4' is smoothed by the smoothing capacitor C3' and is subsequently supplied to the second load through the output terminals 6' and 7'.

If a larger load is set and a larger current is output from the switching transistor Q1', a higher voltage is generated across the resistor R1'. When this voltage exceeds the threshold value, the comparator Q2' outputs a signal to the PWM circuit 3'. In response to the signal from the comparator Q2', the PWM circuit 3' stops a pulse output operation to perform overload protection. This operation is performed for every pulse.

In the conventional apparatus shown in FIG. 6, however, overload protection is performed by limiting the sum of power (to be referred to as total power hereinafter) of all the output systems.

If, therefore, a load is concentrated on a specific secondary circuit, since power can be supplied up to the total power value, a specific part may be overheated, or an overcurrent may flow in the load, resulting in burning the load.

SUMMARY OF THE INVENTION

The present invention has been made to solve the above-described conventional problems, and has as its object to provide a power supply having an overcurrent protective circuit for realizing optimal overcurrent protection.

In order to achieve the above object, according to an aspect of the present invention, an overcurrent protective circuit of a switching DC power supply apparatus comprises primary current detection means, constituted by a comparator for detecting a peak current value of the switching element for every switching period and operating on the basis of the detected peak current value, and secondary current detection means for detecting DC output currents and operating on the basis of an average value of the DC output currents, wherein a threshold value of the comparator is offset by an output from the secondary current detection means.

With the above-described arrangement, in the overcurrent protective circuit of the switching DC power supply apparatus, when a peak current flows for only a short period of time, the primary current detection means is not operated until the peak current exceeds a preset peak load current level. In contrast to this, if a peak current continuously flows and exceeds an average current detection level, the secondary current detection means is operated to offset the detection level of the primary current detection level, thus realizing optimal overload protection.

It is another object of the present invention to provide a switching DC power supply apparatus which can perform optimal overcurrent protection in accordance with the type and operation state of a load.

In order to achieve the above object, according to another aspect of the present invention, there is provided a switching DC power supply apparatus for converting an AC current, generated by turning on and off an DC input using a switching element, into a DC current, and supplying the DC current to a load, comprising current detection means for detecting a current flowing in the switching element, threshold value setting means for setting an overcurrent detection threshold value of the switching element, offset means for offsetting the threshold value in accordance with a type of the load, an operation state, and the like, and control means for comparing an output from the current detection means with the offset threshold value to obtain a comparison signal, and controlling a switching operation of the switching element by using the comparison signal.

With the above-described arrangement, the threshold value for overcurrent detection is offset in accordance with the type and operation state of a load, thus performing optimal overcurrent protection in accordance with the type and operation state of a load.

The apparatus further includes load current detection means for detecting an average value of load currents, in addition to the offset means, so that an offset operation based on an output from the load current detection means is also performed. Therefore, even if abnormality occurs in the offset means, proper overcurrent protection can be performed by an offset operation by the overcurrent detection means.

It is still another object of the present invention to provide a switching DC power supply apparatus which limits the total power within a predetermined value, and further limits the total power to be smaller than the predetermined value when at least one of loads to be subject to overload detection (to be referred to as predetermined loads hereinafter) is overloaded, thereby preventing overheating, burning, or the like in parts due to overloading.

In order to achieve the above object, according to still another aspect of the present invention, there is provided a switching DC power supply apparatus for converting an AC current, generated by turning on and off a DC input using a switching element, into a DC current, and supplying the DC current to at least two loads, comprising current detecting means for detecting a current flowing in the switching element, overload detection means for detecting an overload state of at least one load of at least the two loads, offset means for offsetting an output from the current detection means in accordance with an output from the overload detection means, and control means for controlling a switching operation of the switching element on the basis of an output from the offset means.

In addition, the overload detection means detects at least one of excessive values of current, voltage, and temperature of a load.

The apparatus further includes signal delay means for delaying the output from the overload detection means by a period of time corresponding to the duration of an inrush current in the load, and supplying the delayed output to the offset means.

With the above-described arrangement, if all the predetermined loads are not overloaded, the total power is limited within the predetermined value on the basis of an output from the current detection means. If at least one of the predetermine-d loads is overloaded, the total power is further limited to be lower than the predetermined value by an offset operation.

Since the apparatus further includes the signal delay means, even in a load such as a motor in which a large inrush current flows, no inconveniences, e.g., a voltage drop, are caused by an overload protective operation due to the inrush current.

The above and other objects, features, and advantages of the present invention will be apparent from the following detailed description of the preferred embodiments in conjunction with the accompanying drawings.

DETAILED DESCRIPTION OF THE PREFERRED EMBODIMENTS

Embodiments of the present invention will be described below with reference to the accompanying drawings.

Figure 5:
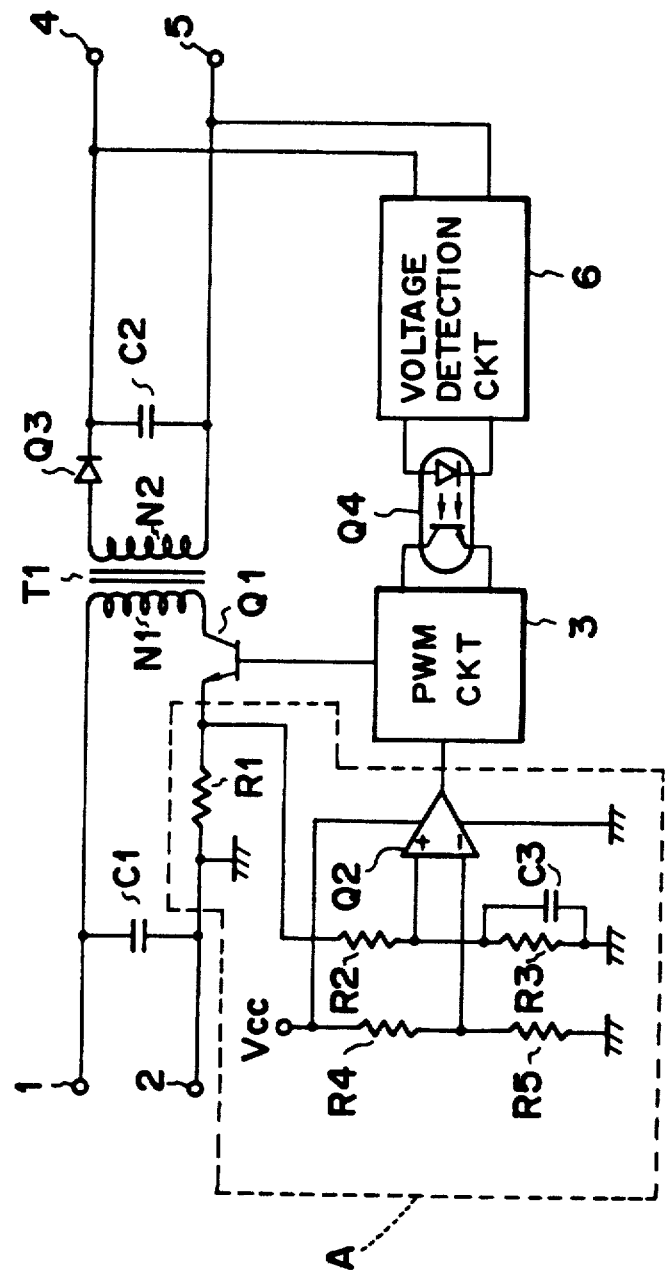
FIG. 5 is a circuit diagram showing a conventional switching DC power supply apparatus.

The same reference numerals in the drawings denote the same parts as in FIG. 5 showing the conventional apparatus, and a description thereof will be omitted.

Figure 1:
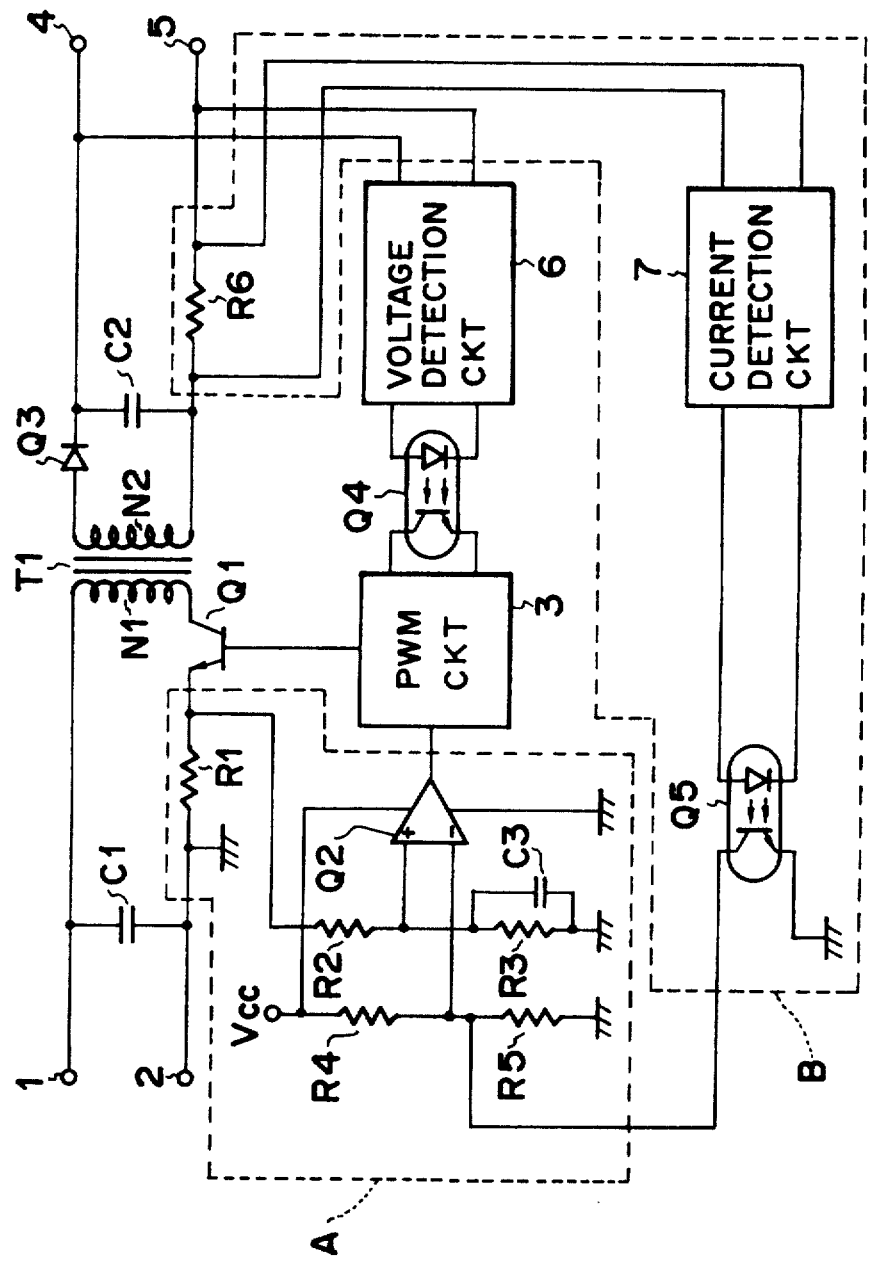
FIG. 1 is a circuit diagram showing a switching DC power supply apparatus according to the first embodiment of the present invention.
Figure 2A:
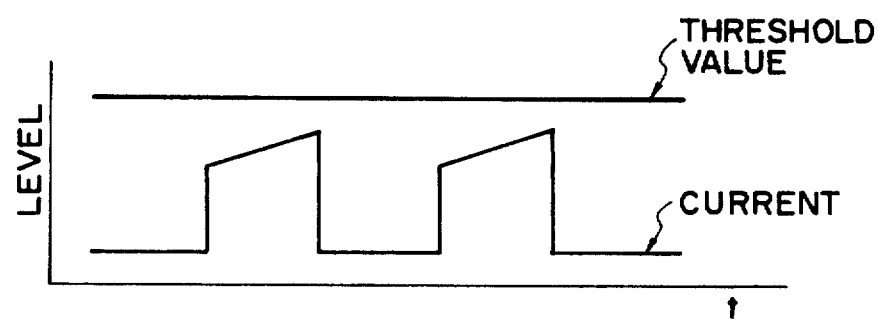
FIGS. 2A and 2B are graphs respectively showing threshold values for current detection.
Figure 2B:
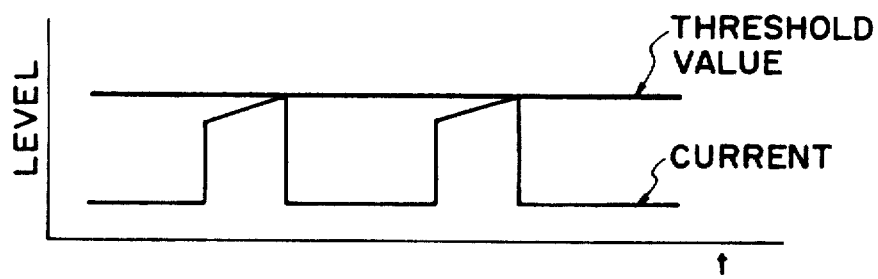

FIG. 1 is a schematic circuit diagram showing the arrangement of a switching DC power supply apparatus according to an embodiment of the present invention. FIGS. 2A and 2B are graphs respectively showing threshold values for current detection in this embodiment.

The apparatus shown in FIG. 1 is different from the conventional apparatus shown in FIG. 5 in that a secondary current detection means B constituted by a current detection resistor R6, a current detection circuit 7, and a photocoupler Q5 is added to a secondary circuit, and the output of the photocoupler Q5 is connected to a threshold value setting circuit constituted by resistors R4 and R5 of a primary current detection means A. The current detection circuit 7 is constituted by an operational amplifier, a transistor, and the like.

The secondary current detection means B detects a voltage proportional to an output current by using a current detection resistor R6, and determines an average output current by inputting this detected voltage to the current detection circuit 7. An output from the current detection circuit 7 is supplied, as an offset value corresponding to the average output current, to the primary current detection means A through the photocoupler Q5.

Upon reception of the output from the secondary current detection means B, the primary current detection means A decreases the current detection threshold value of the switching transistor Q1 to lower the overcurrent detection level.

If, therefore, there is no input from the secondary current detection means B, the threshold value for current detection is set at a level at which a peak current can be supplied, as shown in FIG. 2A. In contrast to this, if an input from the secondary current detection means B is received, the detection level of the primary current detection means A is shifted downward to limit a current, as shown in FIG. 2B. In this embodiment, the transistor portion of the photocoupler Q5 serves as a variable resistance element.

Although a flyback type switching power supply is exemplified in this embodiment, the present invention can be applied to forward type and push-pull type switching power supplies. In addition, although a transistor is used as the switching element Q1, other elements such as an FET and a GTO can be used.

Figure 3:
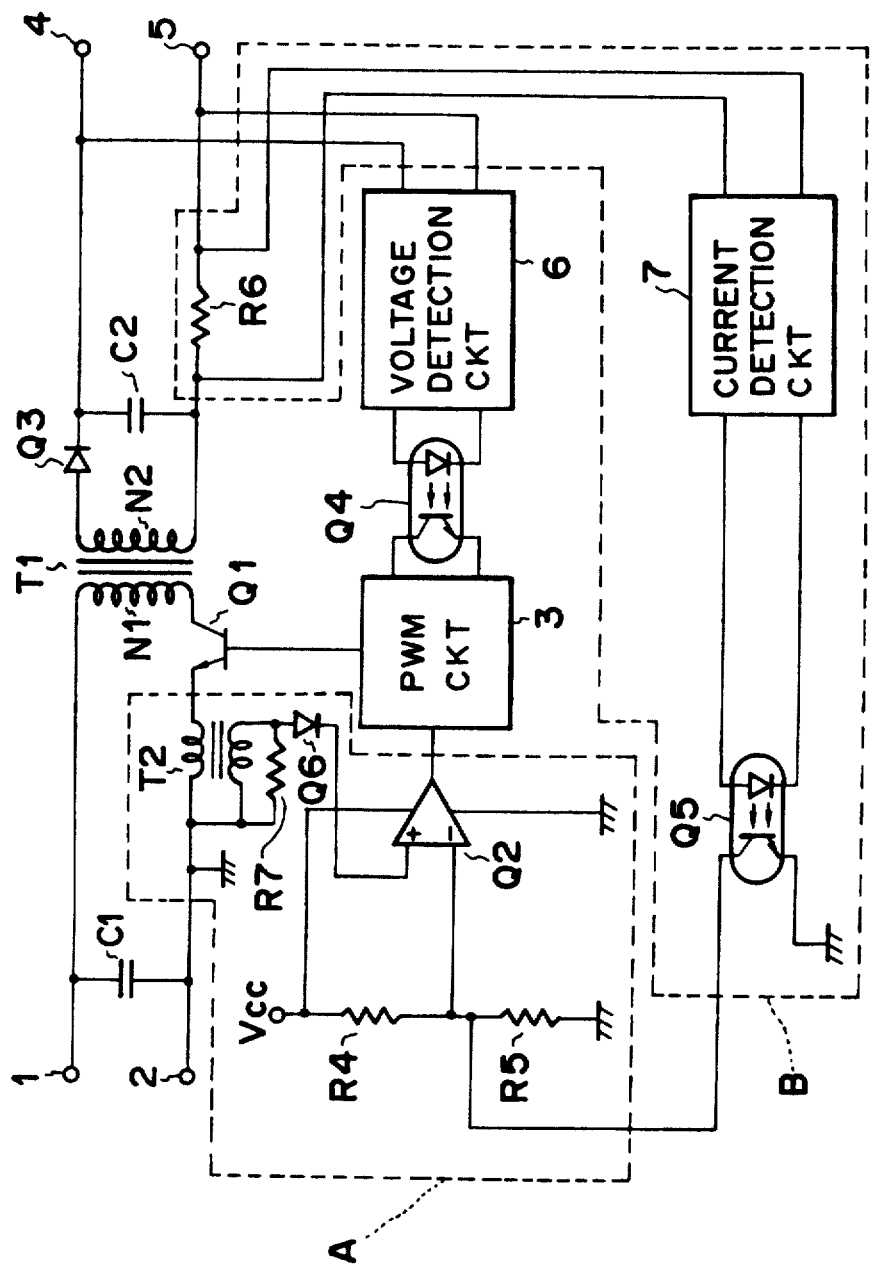
FIG. 3 is a circuit diagram showing a switching DC power supply apparatus according to the second embodiment of the present invention.

The second embodiment of the present invention will be descried with reference to FIG. 3. The same reference numerals in FIG. 3 denote the same parts as in the first embodiment, and a description thereof will be omitted.

Although a resistor is used to detect a primary pulse current in the circuit of the first embodiment, a current transformer is used in the second embodiment. Other arrangements are the same as those of the first embodiment.

A primary pulse current is transformed by a current transformer T2 and is converted into a voltage by an end resistor R7. The voltage is then rectified by a diode Q6 to be input to a comparator Q2.

The subsequent operation is the same as that in the first embodiment.

Figure 4:
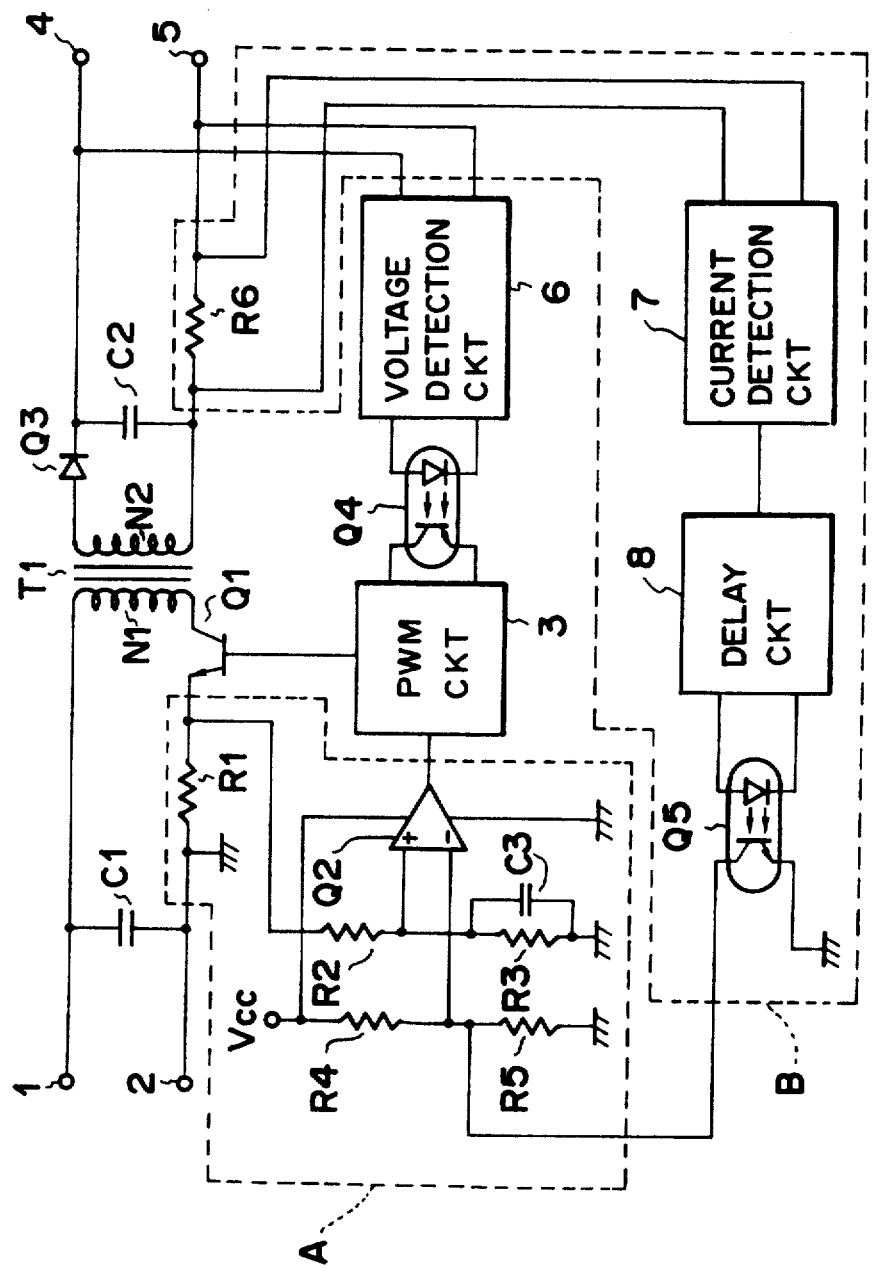
FIG. 4 is a circuit diagram showing a switching DC power supply apparatus according to the third embodiment of the present invention.

The third embodiment of the present invention will be described next with reference to the circuit diagram in FIG. 4. The same reference numerals in FIG. 4 denote the same parts as in the first embodiment, and a description thereof will be omitted.

In this embodiment, a delay circuit 8 is additionally arranged between the current detection circuit 7 of the secondary current detection means B and the photocoupler Q5 of the first embodiment to constitute a secondary current detection means B.

The delay circuit 8 can arbitrarily set a delay time of secondary current detection, thus setting an optimal detection delay time in accordance with a load, e.g., a load in which the duration of an inrush current is long.

The secondary current detection means B is not operated with respect to an overcurrent which flows for only a short period of time. If, however, the duration of an overcurrent exceeds a preset period of time, the secondary current detection means B outputs an offset value to the first current detection means A through the photocoupler Q5.

The subsequent operation is the same as that in the first embodiment.

As described above, in the power supply for a motor load or the like, an output from the secondary current detection means B for detecting an average DC output current value is provided, as an offset value, for the primary current detection means A for detecting a peak current for every pulse. With this arrangement, anti-heat design of a heat sink plate, a transformer, a switching element, and the like can be made on the basis of an average output current, which, in the conventional arrangement, must be made on the basis of a peak current. Therefore, the size and cost of the switching DC power supply apparatus can be further reduced as compared with the conventional apparatus.

Several embodiments will be described below, in which overcurrent protection is performed by a CPU in accordance with the type of load, its operation state, and the like.

Figure 7:
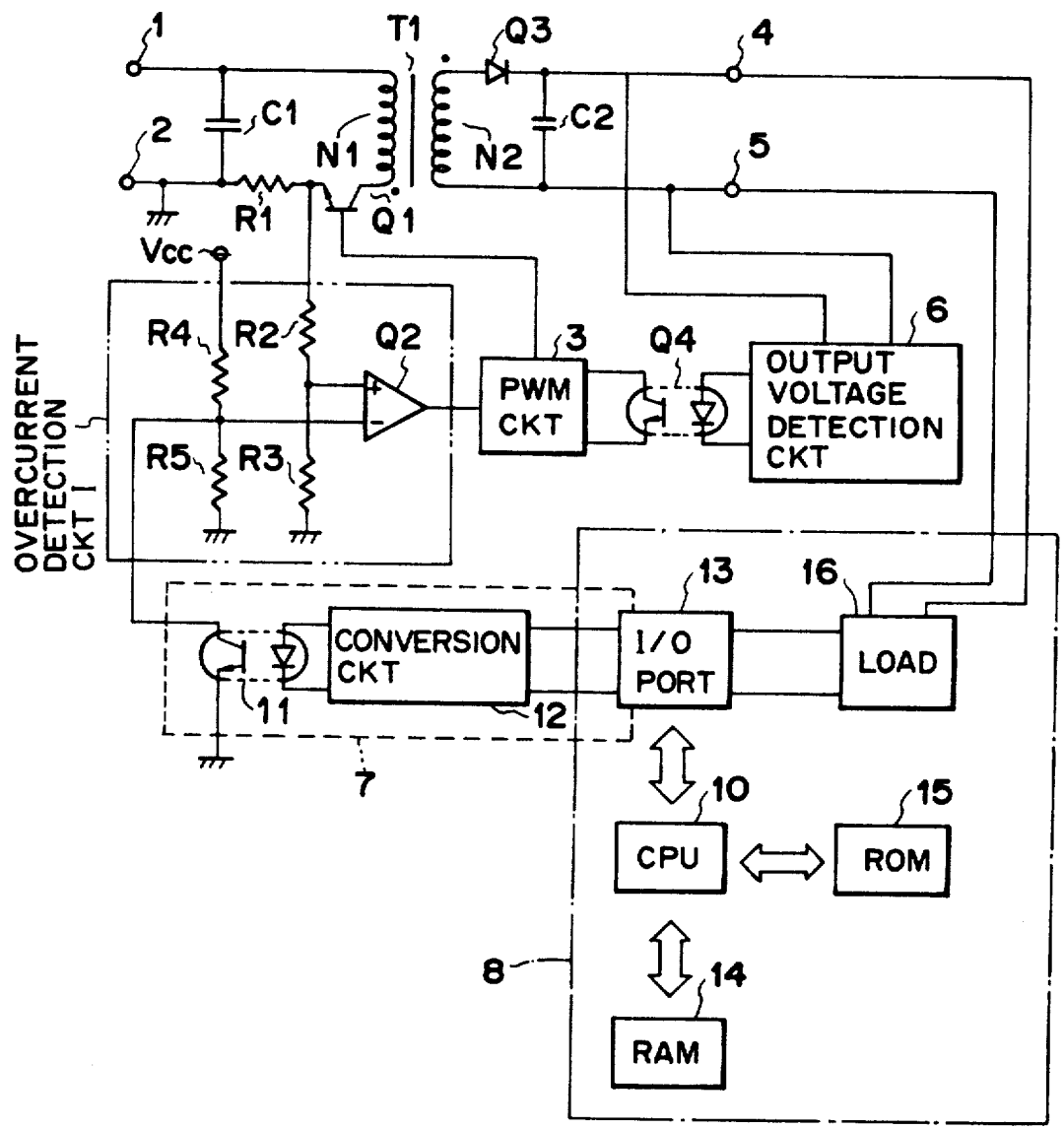
FIG. 7 is a block diagram showing the fourth embodiment of the present invention.

FIG. 7 is a block diagram showing a switching DC power supply apparatus according to the fourth embodiment of the present invention.

As shown in FIG. 7, in the power supply apparatus of this embodiment, a CPU 10 of a device body 8 is connected to the overcurrent detection circuit of the conventional power supply apparatus through an interface circuit 7 (an I/O port 13, a conversion circuit 12, and a photocoupler 11). Storage units (a ROM 15 and a RAM 14) in which various control data are stored are connected to the CPU 10 on the device body side. The CPU 10 selects a load to be driven in accordance with an operation mode and outputs a control signal to a selected load 16. In addition, the CPU 10 reads out an offset value corresponding to each operation mode from a table, arranged in the ROM 15 or the RAM 14, in which offset values of an overcurrent detection level are stored, and outputs it to an overcurrent detection circuit I through the interface circuit 7. The interface circuit 7 adjusts the threshold value of overcurrent detection of the overcurrent detection circuit I to the data set by the CPU 10, and outputs it to the overcurrent detection circuit I. With this operation, the overcurrent detection level of the overcurrent detection circuit I is adjusted in accordance with the operation mode of the device, and overcurrent protection is properly performed in accordance with a load. Note that the transistor portion of the photocoupler 11 is used as a variable resistor.

Figure 8A:
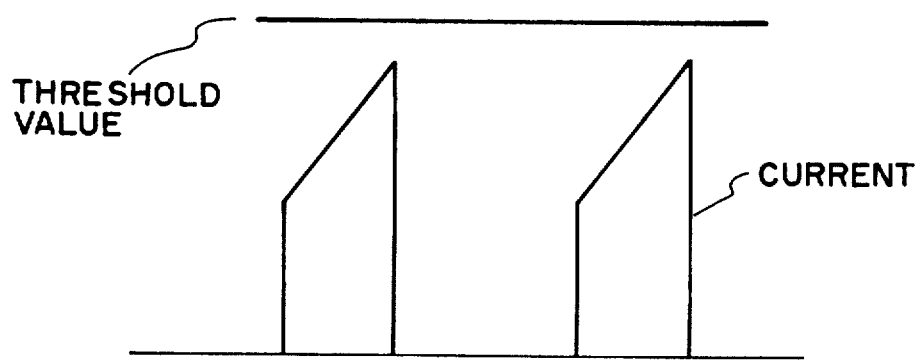
FIGS. 8A and 8B are graphs for explaining the fourth embodiment.
Figure 8B:
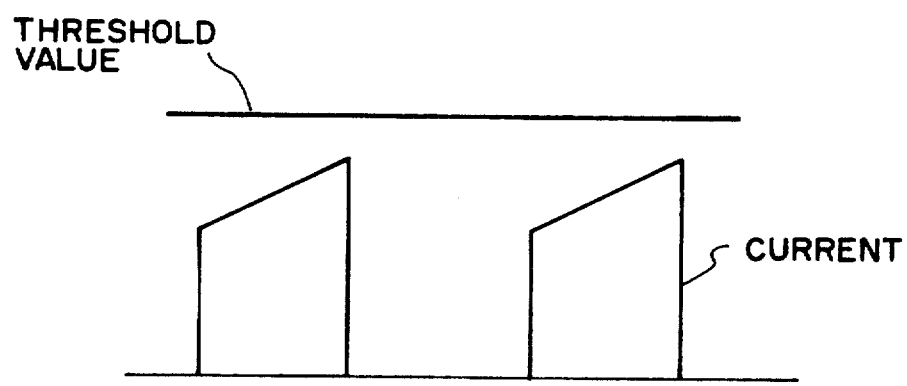

With this arrangement, when a motor load or the like is to be driven, the CPU 10 increases the overcurrent detection level, i.e., the threshold value, of the overcurrent detection circuit I to allow a peak current to flow, as shown in FIG. 8A. In contrast to this, when another type of load is to be driven, the CPU 10 decreases the overcurrent detection level of the overcurrent detection circuit I to limit an overcurrent, as shown in FIG. 8B.

In addition, the CPU 10 increases or decreases the overcurrent detection level in accordance with the operation state of a load, thus limiting an overcurrent.

As described above, according to this embodiment, current limitation can be performed in accordance with the type and operation state of a load to prevent overheating of the switching transistor Q1, destruction of a load, and the like.

Figure 9:
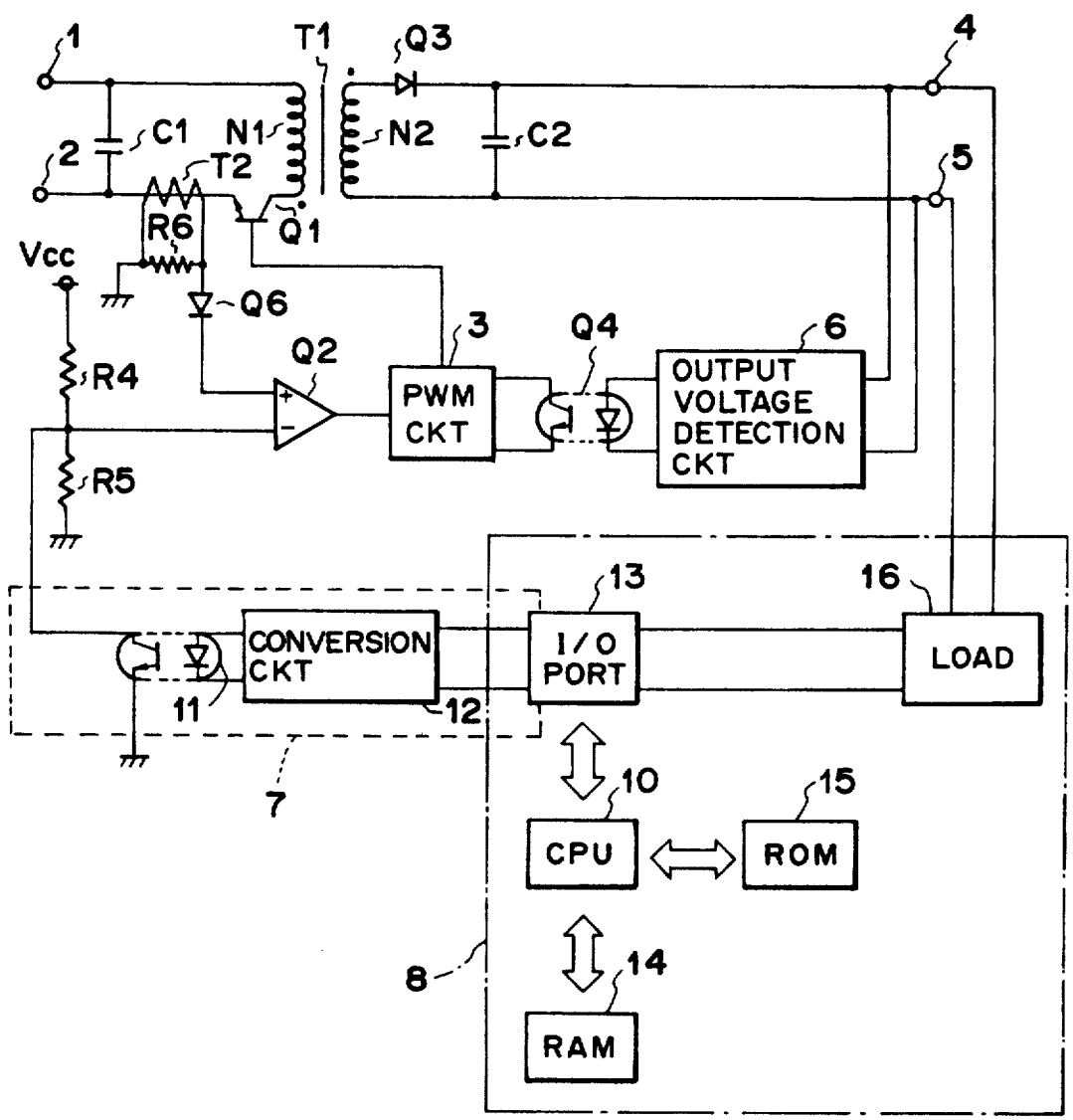
FIG. 9 is a block diagram showing the fifth embodiment of the present invention.

FIG. 9 is a block diagram showing the fifth embodiment of the present invention. As shown in FIG. 9, the circuit arrangement of the fifth embodiment is the same as that of the fourth embodiment except for the following point. In the fourth embodiment, a resistor is used as a current detection means for detecting a pulse current flowing in the switching transistor Q1. In the fifth embodiment, however, a current transformer T2 is used as a current detection means.

More specifically, a primary pulse current is transformed by the current transformer T2 and is converted into a voltage by an end resistor R6. The voltage is then rectified by a diode Q6 to be input to a comparator Q2.

The subsequent operation is the same as that in the fourth embodiment.

Figure 10:
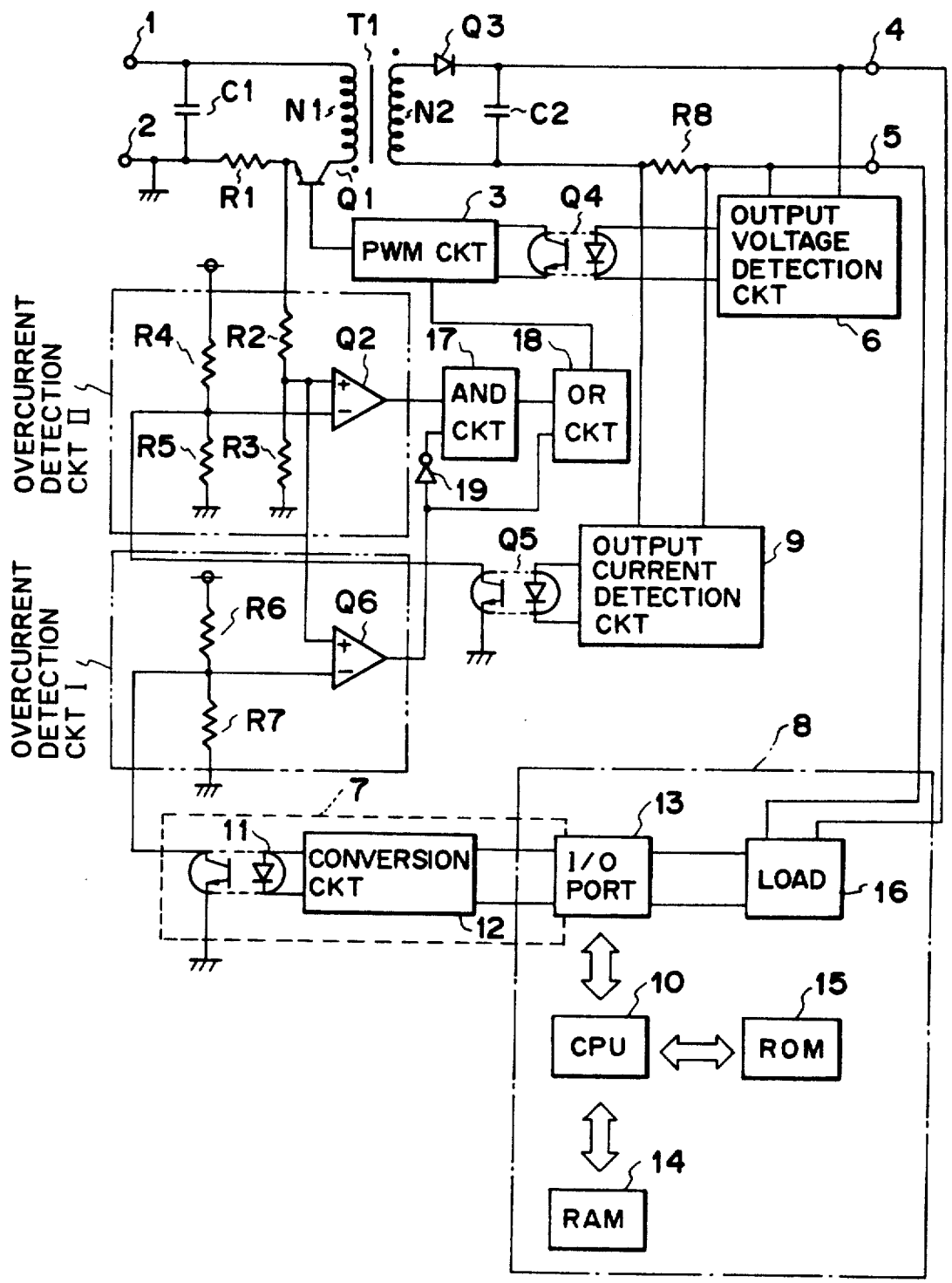
FIG. 10 is a block diagram showing the sixth embodiment of the present invention.

FIG. 10 is a block diagram showing the sixth embodiment of the present invention. As shown in FIG. 10, the circuit arrangement of the sixth embodiment is different from that of the fourth embodiment in that a resistor R8, an output current detection circuit 9, and a photocoupler Q5 are additionally arranged on the secondary side of the circuit, and an overcurrent detection circuit II, an AND circuit 17, and an OR circuit 18 are additionally arranged on the primary side of the circuit.

The output current detection circuit 9 has the same function as that of the CPU in the fourth embodiment and is constituted by an operational amplifier, a transistor, and the like. The output current detection circuit 9 outputs a voltage proportional to the average value of output currents from the resistor R8. This output is supplied, as an offset value, to the overcurrent detection circuit II through the photocoupler Q5. With this operation, the overcurrent detection circuit II performs the same operation as that performed upon reception of an output from the CPU in the fourth embodiment. The AND circuit 17 calculates the logical AND between the resulting output from the overcurrent detection circuit II and the inverted value of an output from an overcurrent detection circuit I which is based on an output from a CPU 10. The logical OR between this logical AND and the output from the overcurrent detection circuit I is calculated by the OR circuit 18, and the resulting value is supplied to a PWM circuit 3.

With the above-described arrangement, even if an output from a comparator Q6 is not set at "H" because of an error on the CPU 10 side or an error in a control signal from the CPU 10, an "H" output is supplied to the AND circuit 17 through an inverter 19, and an output from the current detection circuit 9 on the secondary side is supplied to the PWM circuit 3 through the AND circuit 17 and the OR circuit 18. Therefore, proper overcurrent protection can be secured.

In each embodiment described above, the flyback type switching DC power supply apparatus is exemplified. However, the present invention is not limited to this but can be applied to forward type and push-pull type switching DC power supply apparatuses. In addition, although a transistor is used as the switching element Q1, other elements such as an FET and a GTO can be used.

As described above, according to the fourth to sixth embodiments, in the power supply for an electronic device or the like incorporating a CPU, since the overcurrent detection level is offset by an output from the CPU in accordance with the type and operation state of a load, proper overcurrent protection can be performed in accordance with the type and operation state of the load. With this arrangement, anti-heat design of a heat sink plate, a transformer, a switching element, and the like can be made on the basis of an average output current, which, in the conventional arrangement, must be made on the basis of a peak current. Therefore, the size and cost of the switching DC power supply apparatus can be further reduced.

Figure 11:
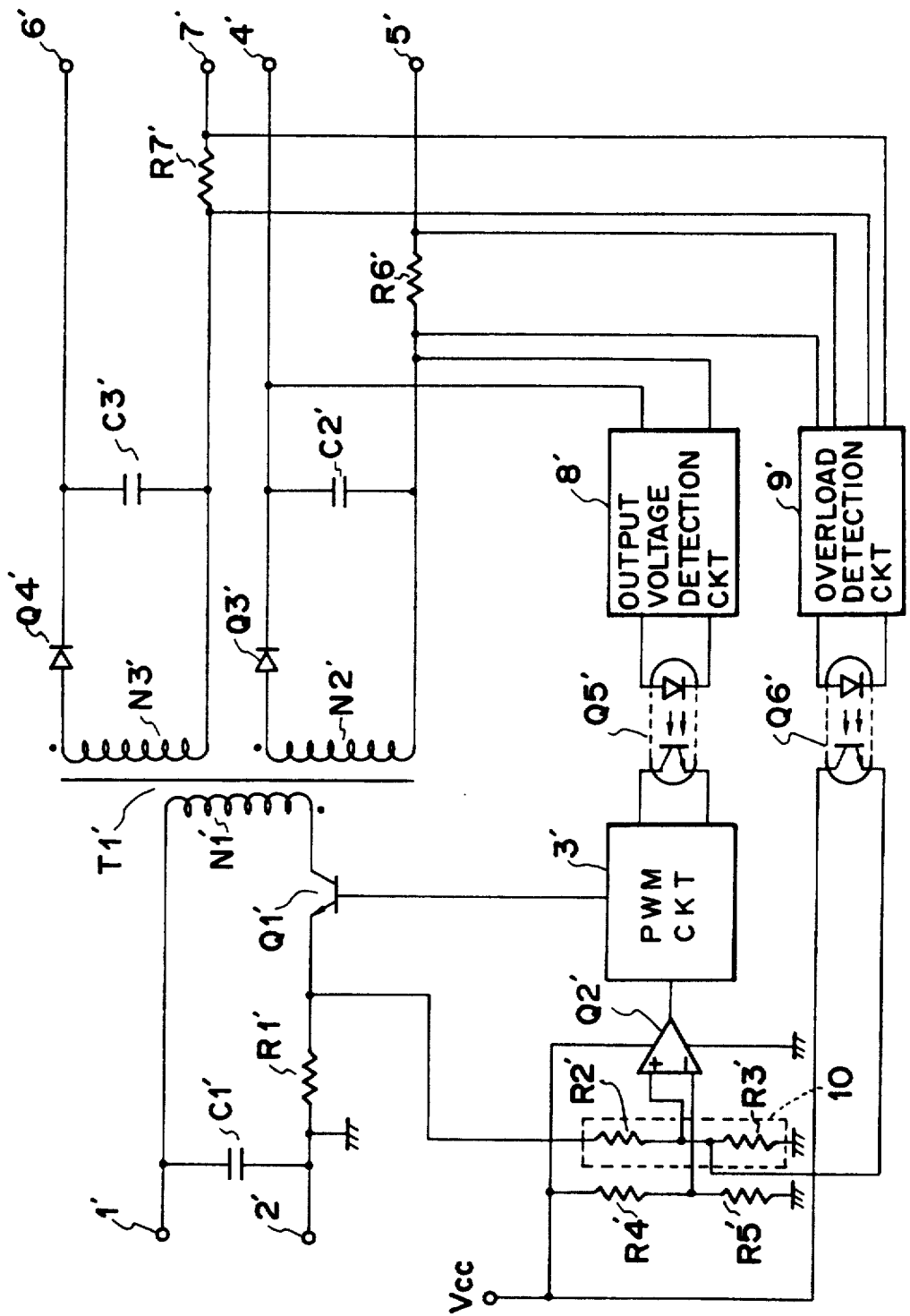
FIG. 11 is a circuit diagram showing the seventh embodiment of the present invention.

FIG. 11 is a circuit diagram showing a switching DC power supply apparatus according to the seventh embodiment of the present invention.

Figure 6:
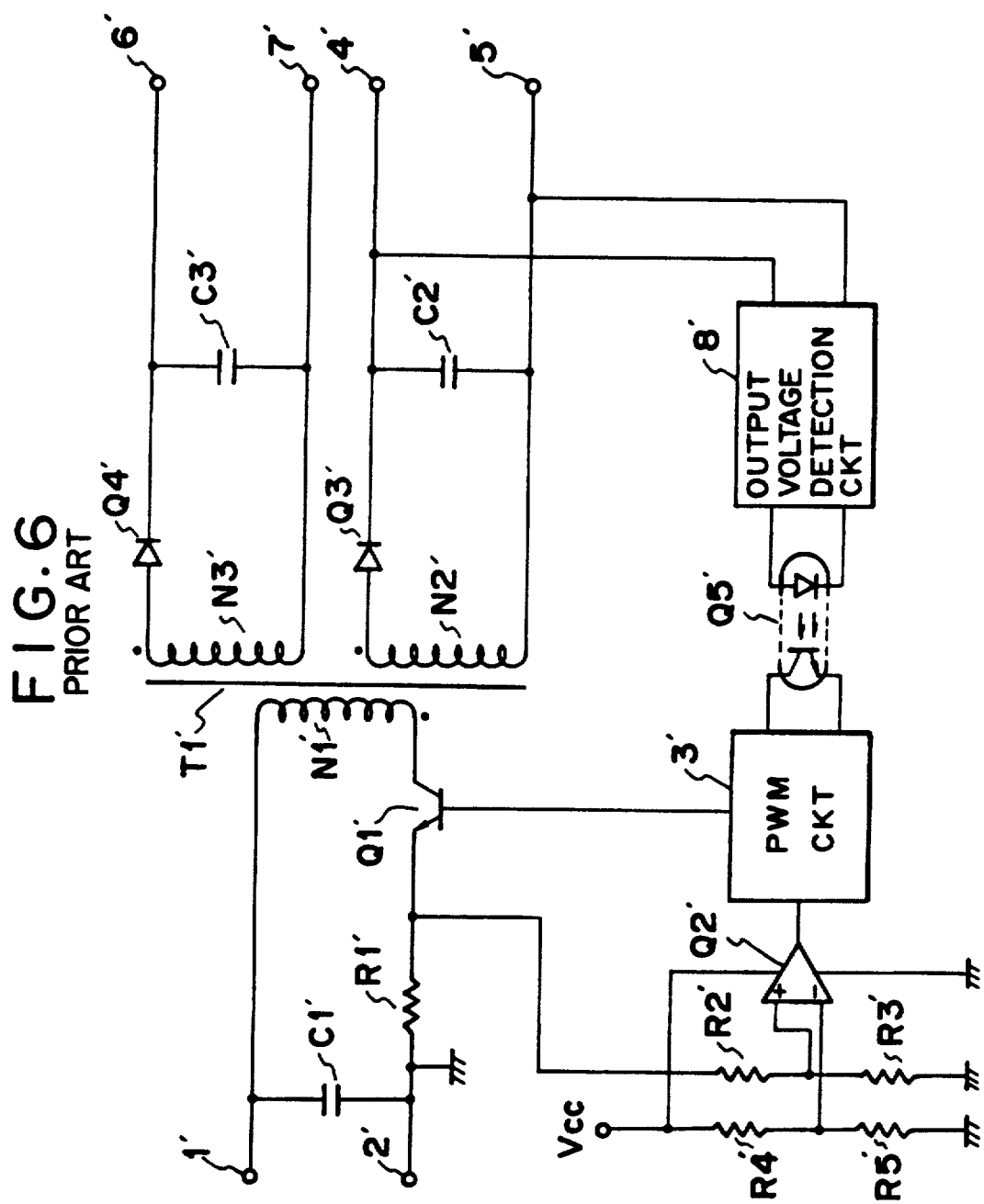
FIG. 6 is a circuit diagram showing a conventional switching DC power supply apparatus designed to supply power to a plurality of loads.

The apparatus shown in FIG. 11 is different from the conventional apparatus shown in FIG. 6 in that resistors R6′ and R7′ are connected, as load state detection means, in series with loads, respectively, and a feedback circuit is constituted by an overload detection circuit 9′ and a photocoupler Q6′.

A secondary winding N2′ of a transformer T1′ is connected to a smoothing capacitor C2′ through a rectifying diode Q3′. The smoothed output obtained by this filter circuit is supplied to output terminals 4′ and 5′ through the resistor R6′. The smoothed DC current is then supplied from the output terminals 4′ and 5′ to a first load (not shown).

Similarly, a secondary winding N3′ is connected to a smoothing capacitor C3′ through a rectifying diode Q4′. The smoothed output obtained by this filter circuit is supplied to output terminals 6′ and 7′ through a resistor R7′. The smoothed DC current is then supplied from the output terminals 6′ and 7′ to a second load (not shown).

The overload detection circuit 9′ is constituted by an operational amplifier, a transistor, and the like. The overload detection circuit 9′ detects overloads in the first and second loads on the basis of voltages proportional to load currents generated in the resistors R6′ and R7′. An output from the overload detection circuit 9′ is output to an offset circuit 10′ constituted by resistors R2′ and R3′ through the photocoupler Q6′.

The offset circuit 10′ serves to add an output, supplied from the overload detection circuit 9′, to a detection output obtained by a resistor R1′. A change in detection output due to this addition is called an "offset".

An overload protective operation of the seventh embodiment will be described next.

Figure 12A:
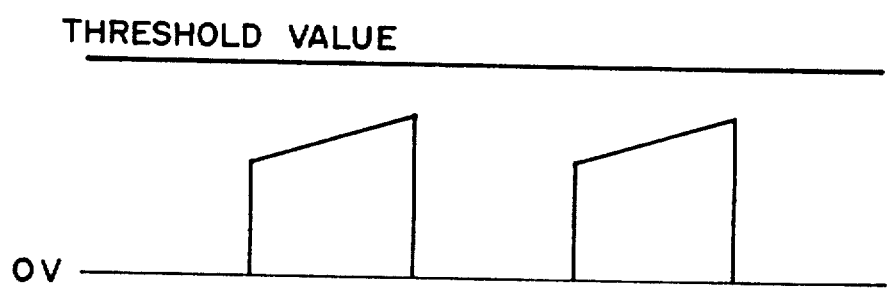
FIGS. 12A and 12B are graphs for explaining an operation of the seventh embodiment.

If both load currents to the first and second loads have normal values, the overload detection circuit 9 outputs no signal. Therefore, the noninverting (+) input of a comparison circuit Q2′ is set at a level lower than the threshold value of the inverting (−) input, as shown in FIG. 12A.

If an excessive load current flows in any one of the loads and an overload state occurs, the overload detection circuit 9′ outputs a signal to the offset circuit 10′ through the photocoupler Q6′. The offset circuit 10′ offsets a signal proportional to a current, output from a switching transistor Q1′ and detected by the resistor R1′, by a value S in response to the output from the overload detection circuit 9′. The offset circuit 10′ outputs the resulting signal to the comparison circuit Q2′.

Figure 12B:
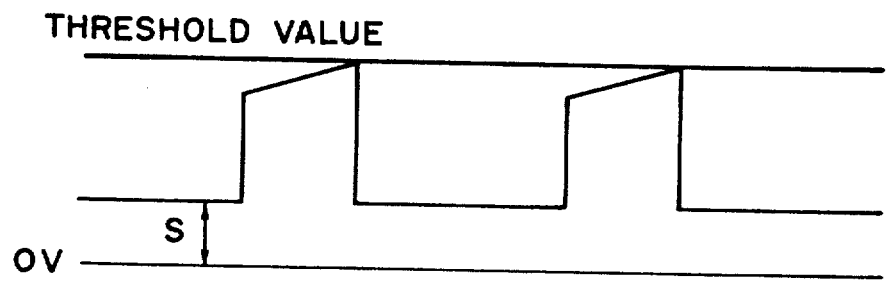

If the output from the offset circuit 10′ exceeds the threshold value, as shown in FIG. 12B, the comparison circuit Q2′ outputs a signal to a PWM circuit 3′ to limit the output pulse width, thereby preventing overheating, burning, or the like in parts due to the above-described overload. Note that an offset amount is properly determined in accordance with specifications.

Figure 13:
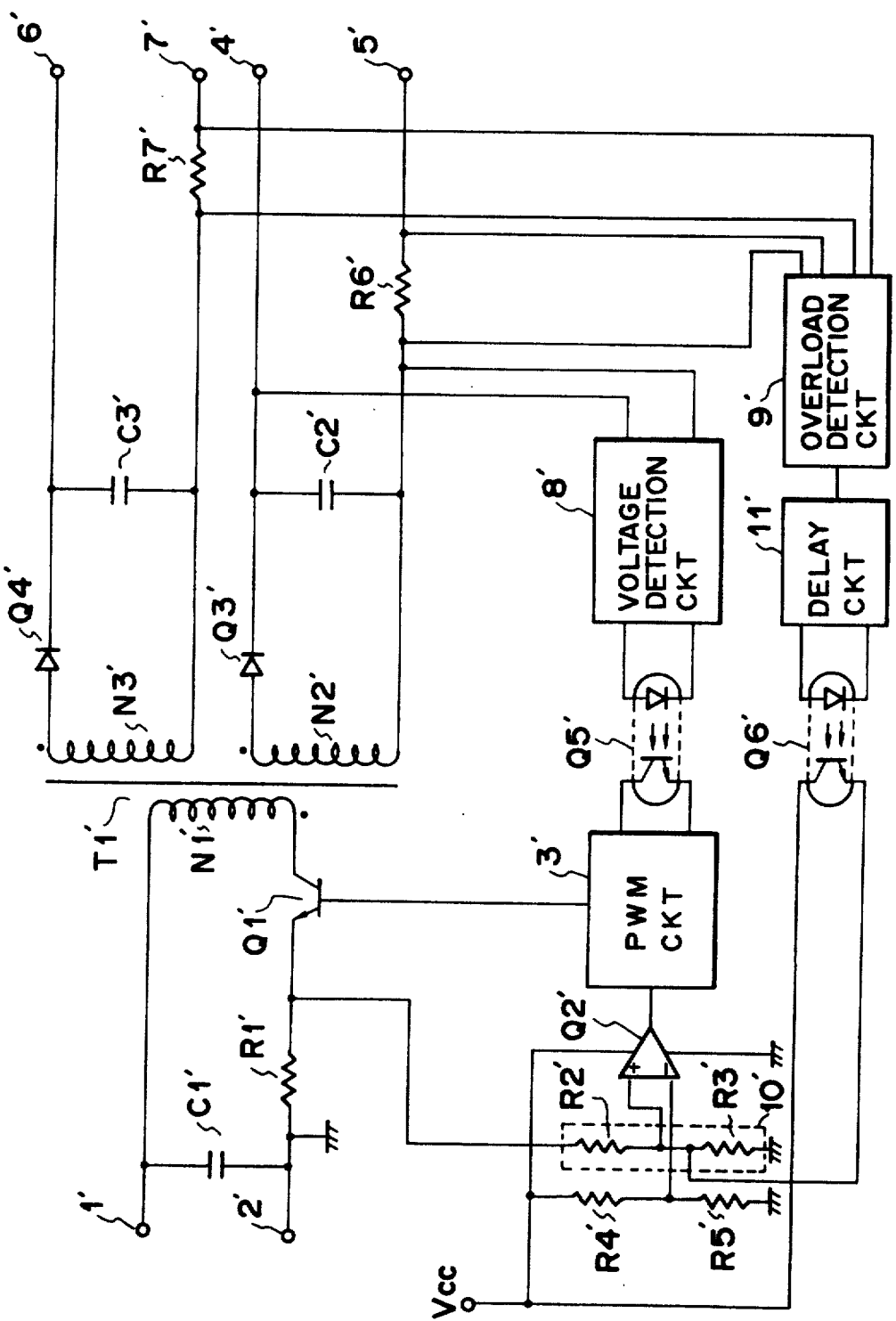
FIG. 13 is a circuit diagram showing the eighth embodiment of the present invention.

The eighth embodiment of the present invention will be described below with reference to FIG. 13.

In this embodiment, a delay circuit 11′ is additionally arranged between the overload detection circuit 9′ and the photocoupler Q6′ in the circuit of the seventh embodiment.

The delay circuit 11′ delays a signal output from the overload detection circuit 9′. In a load such as a motor in which a large inrush current flows, a delay time is set to be substantially equal to the duration of the inrush current to prevent inconveniences, e.g., a voltage drop, caused by an overload protective operation due to the inrush current. Other operations are the same as those in the first embodiment.

The ninth embodiment of the present invention will be described below with reference to FIG. 14.

In the seventh embodiment, power is supplied from the different secondary winding members of the transformer T1′ to the respective loads. In this embodiment, however, power is supplied from one secondary winding N2′ to a plurality of loads through branch lines.

Figure 14:
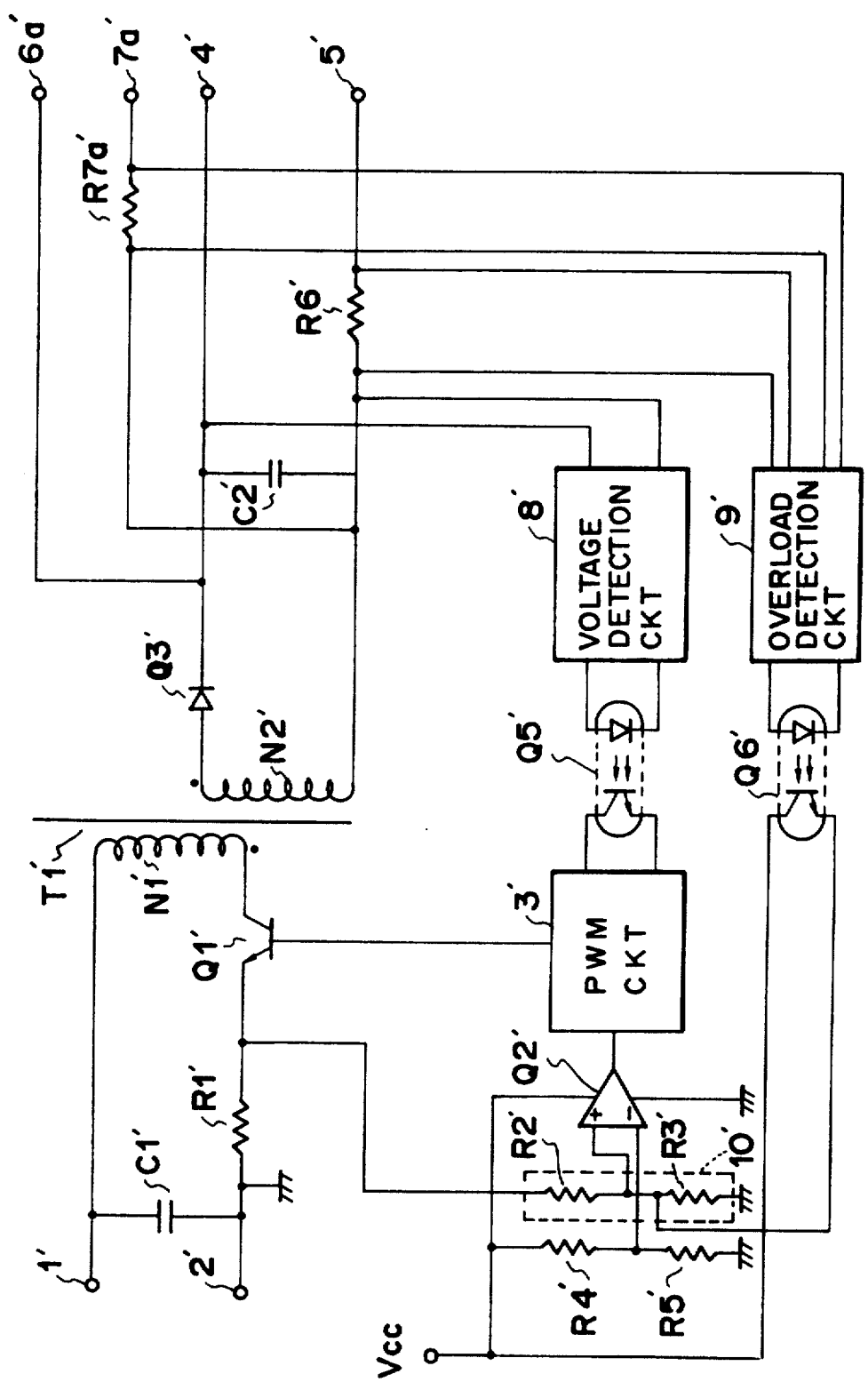
FIG. 14 is a circuit diagram showing the ninth embodiment of the present invention.

As shown in FIG. 14, the secondary winding N2′ of a transformer T1′ is connected to a smoothing capacitor C2′ through a rectifying diode Q3′. The smoothed output obtained by this filter circuit is supplied to a first load through a resistor R6′ and output terminals 4′ and 5′ and is simultaneously supplied to a second load through a resistor R7′ and output terminals 6′ and 7′. The operation and effect of this embodiment are the same as those of the seventh embodiment.

In each embodiment described above, the flyback type switching DC power supply apparatus is exemplified. However, the present invention is not limited to this but can be applied to forward type and push-pull type switching DC power supply apparatuses.

Although an apparatus having two output systems is exemplified in each embodiment, the present invention can be applied to an apparatus having three or more output systems. In addition, a load state detection means may be provided for one or more systems which require protection.

Although a transistor is used as the switching element Q1, other elements such as an FET and a GTO can be used.

Although a resistor is used as a current detection means for the switching element Q1, other means such as a current transformer may be used.

Although a load current detection circuit constituted by a resistor is used as a load state detection means, any detection means, e.g., a load voltage detection circuit and a load temperature detection circuit, can be used as long as they are designed to detect the state of a load, or a combination thereof can be used.

Furthermore, each embodiment is designed to detect an instantaneous value output from the switching element Q1. However, the present invention is not limited to this but the average value of outputs for a short period of time may be detected.

As described above, according to the seventh to ninth embodiments of the present invention, when each load is in a normal state, the total power can be limited within a predetermined value. In addition, if any one of the loads is overloaded, the total power is further limited to be lower than the predetermined value to prevent overheating, burning, or the like in parts due to overloading.

The present invention is not limited to the first to ninth embodiments described above. Various changes and modifications can e made within the spirit and scope of the invention as defined in the appended claims.

According to the present invention, there is provided a power supply which can simply realize optimal overload protection.

What is claimed is:

1. A DC power supply apparatus comprising:
   a switching transformer having a switching element;
   primary current detection means, arranged on a primary side of said transformer, for detecting a current flowing in said switching element;
   secondary voltage detection means, arranged on a secondary side of said transformer, for detecting an output voltage of the secondary side;
   feedback means for feeding back the detected output voltage detected by said secondary voltage detection means to said switching element to maintain the output voltage at a constant value;
   secondary current detection means for detecting an output current from said secondary side of said transformer; and
   control means for controlling said switching element on the basis of outputs from said primary and second current detection means such that the output current detected by said secondary current detection means does not exceed a predetermined level.

2. An apparatus according to claim 1, wherein said secondary current detection means detects a plurality of output currents and said control means controls said switching element such that at least one of the plurality of output currents does not exceed a predetermined level.

3. An apparatus according to claim 1, wherein said primary current detection means detects a peak current value of said switching element.

4. An apparatus according to claim 1, wherein said secondary current detection means detects an average current of outputs from the secondary side.

5. An apparatus according to claim 1, wherein said control means includes a comparator for comparing the output from said primary current detection means with a predetermined value, and offsets the predetermined value of said comparator in accordance with the output from said secondary current detection means.

6. A switching DC power supply for a constant voltage, having a secondary voltage detection circuit, arranged on a secondary side of a transformer, for detecting an output voltage of the secondary side, a feedback circuit for feeding back the detected output voltage detected by said secondary voltage detection circuit to a switching element at a primary side, and an overcurrent protective circuit for controlling a DC output current by controlling a driving pulse to said switching element, wherein said overcurrent protective circuit comprises primary current detection means, constituted by a comparator for detecting a peak current value of said switching element for every switching period and operating on the basis of the detected peak current value, and secondary current detection means for detecting DC outputs currents and operating on the basis of an average value of the DC output currents, so that a threshold value of said comparator is offset by an output from said secondary current detection means.

7. A switching DC power supply apparatus for converting an AC current, generated by turning on and off an DC input using a switching element, into a DC current, and supplying the DC current to a load, comprising:
   current detection means for detecting a current flowing in said switching element;
   threshold value setting means for setting an overcurrent detection threshold value of said switching element;
   offset means for offsetting the threshold value in accordance with a type of the load; and
   control means for comparing an output from said current detection means with the offset threshold value to obtain a comparison signal, and controlling a switching operation of said switching element by using the comparison signal.

8. An apparatus according to claim 7, further comprising load current detection means for detecting an average value of load currents, in addition to said offset means, so that an offset operation based on an output from said load current detection means is also performed.

9. A switching DC power supply apparatus for converting an AC current, generated by turning on and off an DC input using a switching element, into a DC current, and supplying the DC current to a load, comprising:
   current detection means for detecting a current flowing in said switching element;
   threshold value setting means for setting an overcurrent detection threshold value of said switching element;
   offset means for offsetting the threshold value in accordance with an operation state of the load; and
   control means for comparing an output from said current detection means with the offset threshold value to obtain a comparison signal, and controlling a switching operation of said switching element by using the comparison signal.

10. An apparatus according to claim 9, further comprising load current detection means for detecting an average value of load currents, in addition to said offset means, so that an offset operation based on an output from said load current detection means is also performed.

11. A switching DC power supply apparatus for converting an AC current, generated by turning on and off a DC input using a switching element, into a DC current, and supplying the DC current to a plurality of loads, comprising:
   current detecting means for detecting a current flowing in said switching element;
   overload detection means for detecting an overload state of any of the plurality of loads;
   offset means for offsetting an output from said current detection means in accordance with an output from said overload detection means; and
   control means for controlling a switching operation of said switching element on the basis of an output from said offset means.

12. An apparatus according to claim 11, wherein said overload detection means detects at least one of excessive values of current, voltage, and temperature of a load.

13. An apparatus according to claim 11, further comprising signal delay means for delaying the output from said overload detection means by a period of time corresponding to the duration of an inrush current in the load, and supplying the delayed output to said offset means.

* * * * *

UNITED STATES PATENT AND TRADEMARK OFFICE
CERTIFICATE OF CORRECTION

PATENT NO. : 5,297,014
DATED : March 22, 1994
INVENTOR(S) : Masayoshi Saito, et al It is certified that error appears in the above-indentified patent and that said Letters Patent is hereby corrected as shown below:

COLUMN 4

Line 5, "an" should read --a--.
    Line 68, "predetermine-d" should read --predetermined--.

COLUMN 6

Line 34, "descried" should read --described--.

COLUMN 10

Line 68, "e" should read --be--.

COLUMN 11

Line 62, "outputs" should read --output--.
    Line 68, "an" should read --a--.

COLUMN 12

Line 22, "an" should read --a--.

Signed and Sealed this

Fourteenth Day of March, 1995

Attest:

BRUCE LEHMAN

*Attesting Officer*     *Commissioner of Patents and Trademarks*